United States Patent

[11] 3,596,871

| [72] | Inventor | Arthur A. Rothrock |
| | | Portland, Oreg. |
| [21] | Appl. No. | 815,770 |
| [22] | Filed | Apr. 14, 1969 |
| [45] | Patented | Aug. 3, 1971 |
| [73] | Assignee | Dupar Dynamics, Division of Palmer Supply Co. |
| | | Portland, Oreg. |

[54] TRACING VALVE
5 Claims, 1 Drawing Fig.

[52] U.S. Cl. .................................................. 251/3,
 137/596.2, 251/214, 251/282
[51] Int. Cl. ........................................................ B23q 35/16,
 F16k 11/10
[50] Field of Search ........................................... 257/3, 214,
 282; 137/596.2, 625.27

[56] References Cited
UNITED STATES PATENTS

| 1,693,720 | 12/1928 | Lyons | 137/596.2 X |
| 2,152,084 | 3/1939 | Paire | 137/625.27 X |
| 2,837,114 | 6/1958 | Ruhl | 137/596.2 |
| 2,923,518 | 2/1960 | Goodrich | 251/3 |
| 2,985,146 | 5/1961 | Randol | 137/596.2 X |
| 3,370,613 | 2/1968 | Weaver | 251/3 X |

FOREIGN PATENTS

| 1,036,062 | 8/1958 | Germany | 137/625.27 |

Primary Examiner—Henry T. Klinksiek
Attorney—Oliver D. Olson

ABSTRACT: The hollow body of a fluid pressure tracing valve contains a pair of longitudinally movable, hollow poppet valves urged apart longitudinally by a spring. A pair of stem sections extend slidably through the hollow valves and are threaded together at their inner ends for adjusting the spacing between shoulders on said sections which confine between them projections on the pair of poppet valves. Valve seals on the poppet valves thus are adjustable relative to associated valve seats on the body.

Patented Aug. 3, 1971
3,596,871
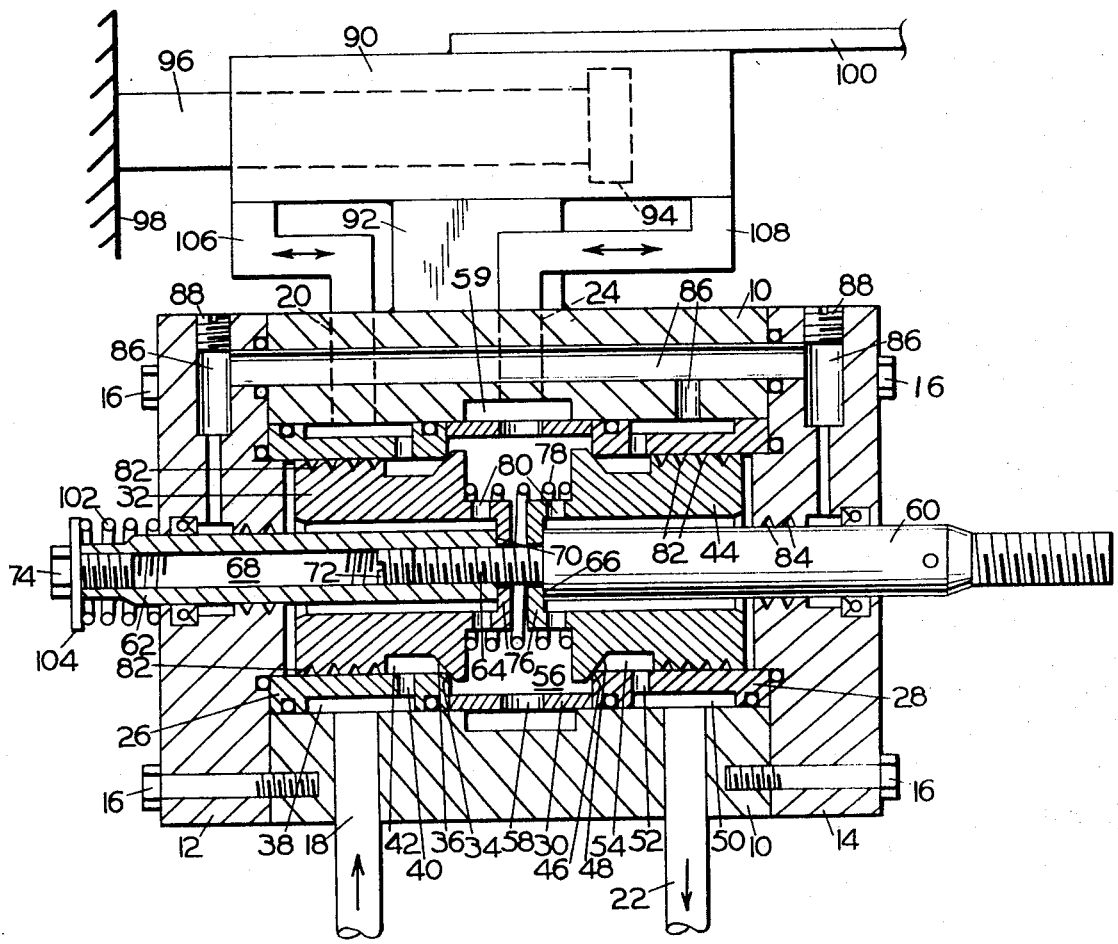
ARTHUR A. ROTHROCK
INVENTOR.
BY *Oliver D. Olson*
AGENT 3,596,871

TRACING VALVE

BACKGROUND OF THE INVENTION

This invention relates to tracing valves, and more particularly to a novel tracing valve in which operational hysteresis is substantially eliminated.

Tracing valves of the prior art are characterized disadvantageously by such a magnitude of operational hysteresis that it is not possible to obtain, with a practicable degree of accuracy, the same set point of a movable load when approached from opposite directions of movement.

In tracing valves provided heretofore, minimization of operational hysteresis is achieved by trial and error grinding or other shaping of valve elements. This is a tedious and time consuming procedure, involving considerable cost. Moreover, it often occurs in such shaping procedure that overcutting of the valve elements results in their destruction. Their loss and consequent replacement reflects additional excessive cost, both in time and material.

Still further, the operational hysteresis of such prior tracing valves increases as the parts become worn during use. Since readjustment to reduce hysteresis is not afforded, the valves ultimately must be discarded.

SUMMARY OF THE INVENTION

The present invention provides a tracing valve in which the relative position of valve elements are adjustable externally, whereby to maintain operational hysteresis at a minimum.

It is by virtue of the foregoing basic concept that the principal objective of the present invention is achieved, namely to overcome the disadvantages of prior tracing valves, as enumerated hereinbefore.

Another important object of the present invention is the provision of a tracing valve in which the movable valve members are maintained in fluid pressure balance at all times, whereby to assure maximum sensitivity of response.

A further important object of this invention is the provision of a tracing valve which is of simplified construction for economical manufacture, which is capable of assembly and disassembly with speed and facility, and which is capable of precise operation over an extended period of use.

The foregoing and other objects and advantages of the present invention will appear from the following detailed description, taken in connection with the accompanying drawing of the preferred embodiment.

BRIEF DESCRIPTION OF THE DRAWING

The single FIGURE of the drawing is a longitudinal section of a tracing valve embodying the features of the present invention, the same being shown in association with a fluid pressure drive cylinder unit.

DESCRIPTION OF THE PREFERRED EMBODIMENT

The tracing valve illustrated in the drawing includes a hollow body 10 closed at its opposite ends by end caps 12 and 14 secured thereto by such means as bolts 16. The body is provided with a fluid pressure infeed passageway 18 and a motor port 20 which communicate at their inner ends with the hollow interior of the body. The body also is provided with an exhaust passageway 22 which communicates at its inner end with the hollow interior of the body. The body further is provided with a motor port 24 which communicates at its inner end with the hollow interior of the body.

Within the hollow body there is contained a pair of hollow valve seat rings 26 and 28 which are spaced apart by a spacer ring 30 and abut at their outer ends against the end caps. The ring 26 supports a hollow poppet valve member 32 for longitudinal reciprocation relative thereto. The ring is provided adjacent its inner end with an annular valve seat 34 disposed for releasable sealing engagement by annular seal 36 formed adjacent the inner end of the valve member.

An annular passageway 38 about the outer periphery of the ring 26 communicates the infeed passageway 18 and motor port 20 with each other. A plurality of ports 40 through the ring communicate the annular passageway 38 with an annular passageway 42 in the outer periphery of the valve member.

In similar manner, the other valve seat ring 38 supports a hollow poppet valve member 44 for longitudinal reciprocation relative thereto. An annular valve seat 46 adjacent the inner end of the ring is disposed for releasable sealing engagement by annular seal 48 formed adjacent the inner end of the valve member. An annular passageway 50 about the outer periphery of the ring communicates with the inner end of the exhaust passageway 22. The annular passageway also communicates through a plurality of ports 52 in the ring with an annular passageway 54 in the outer periphery of the valve member, outwardly of the annular seal 48.

The annular space 56 between the inner ends of the valve members communicates through openings 58 in the spacer ring 30 and an annular groove 59 in the body 10 with the inner end of the motor port 24.

Extending through the hollow valve members 32 and 44 and registering openings in the end caps are a pair of stem sections 60 and 62 which are connected together at their inner ends for longitudinal adjustment. In the embodiment illustrated the inner end of the stem section 60 is provided with a threaded extension 64 of reduced diameter, providing an annular shoulder 66 therebetween. The other stem section 62 is provided with a threaded axial bore 68 adapted to receive the threaded extension 64. The inner end of the stem section 62 forms an annular shoulder 70 surrounding the threaded bore.

Thus, relative rotation of the stem sections effects changing the spacing between the annular shoulders 66 and 70, as will be apparent. A setscrew 72 in the threaded bore is accessible from the outer end of the stem section 62 for turning with a screwdriver or other appropriate tool. The setscrew may be tightened against the adjacent end of the threaded extension 64 to secure the stem sections against relative rotation, whereby to maintain a selected position of adjustment. The outer end of the hollow stem section 62 normally is closed by a screw plug 74.

The inner ends of the valve members 32 and 44 are provided with annular abutments 76 which extend radially inward for abutment against the spaced shoulders 66 and 70 of the stem sections. The abutments are held against the shoulders by the resilience of a coil spring 78 which encircles the inner end portions of the valve members. The opposite ends of the spring abut the spaced, facing surfaces of the valve members, as illustrated.

It can be seen that as the stem sections are rotated relative to each other to shorten or lengthen the space between the shoulders 66 and 70, the valve members are moved correspondingly to shorten or lengthen the distance between the annular seals 36 and 48. In this regard it is desirable to adjust the distance between the annular seals so that when the seal 36 is in sealing engagement with its associated seat 34, there is a very slight clearance between the seal 48 and its associated seat 46.

The valve construction illustrated also includes means providing fluid pressure balance of the valve members. To this end a plurality of bypass ports 80 through the inner ends of the valve members communicate the annular space 56 with the space between the valve members and stem sections. Fluid pressure thus is directed into the space between the outer ends of the valve members and the adjacent end caps. By this means the inner and outer ends of the valve members are subjected to the same magnitude of fluid pressure. Maximum freedom of movement of the valve members in either direction thus insures maximum sensitivity of response of the valve members to movement of the stem sections.

Means also is provided for balancing the valve members radially with respect to the seat rings. For this purpose of a plurality of longitudinally spaced annular grooves 82 are provided in the outer peripheries of the valve members. Thus, in the event of seepage of fluid pressure through the space between the valve members and seat rings, the annular grooves serve to distribute the pressure uniformly about the peripheries of the valve members.

Similar annular grooves 84 are provided in the end caps surrounding the bores which slidably receive the stem sections. Thus, any seepage of fluid pressure through the space between the stem sections and end caps is distributed uniformly about the peripheries of the stem sections.

Fluid pressure relief passageways 86 and in the end caps and body communicate with the exhaust passageway 22 to minimize fluid pressure in the areas of fluid pressure seals. The relief passageways also serve to bleed air from the system, when hydraulic fluid is employed. The relief passageways in the end caps are normally closed by the plugs 88.

In the drawing the tracing valve is shown connected to a fluid pressure drive cylinder unit. The cylinder 90 and valve body 10 are interconnected for simultaneous movement by such means as the connecting bracket 92. A reciprocative piston 94 within the cylinder has a piston rod 96 which extends outward through one end of the cylinder and is secured at its outer end to a fixed support 98.

A connecting bar 100 is secured to the cylinder and extends therefrom for connection to a load to be moved. Such a load might, for example, be the tool carriage of a milling machine. The outer threaded end of the stem section 60 thus may be connected to a movable stylus which cooperates with a template for deriving the desired movement of the tool carriage. In general, the system illustrated provides for movement of the stem sections by the application of a very small force, to effect precise movement of a load through the application of a substantial fluid pressure force to the drive cylinder unit.

In the event the outer end of stem section 60 is connected to a tracer force through a cable or other flexible member, it may be desirable to provide means for maintaining the flexible member taut. In the embodiment illustrated, this is provided by coil spring 102 surrounding the outer end of the stem section 62 and abutting at one end against the end cap 12 and at the opposite end against the washer 104 secured to the stem by screwplug 74.

The operation of the tracing valve described hereinbefore is as follows: Let it be assumed that the output of a hydraulic pump is connected to the infeed passageway 18, the pump reservoir is connected to the exhaust passageway 22, and the components of the tracing valve are in normal rest position. Thus, hydraulic fluid under pressure communicates directly through the infeed passageway 18 and motor port 20 and conduit 106 to the left end of the drive cylinder 90.

In this regard, it will be apparent that since the infeed passageway 18 and motor port 20 provide an unobstructed path for fluid pressure from the pump directly to the cylinder, this communication may be made externally of the valve, for example by connecting conduit 106 directly between the pump output and drive cylinder. A bypass conduit then may communicate the conduit 106 with one of the infeed passageway 18 and motor port 20, and the other may be omitted.

Application of hydraulic pressure to the left end of the cylinder 90 causes the latter to move toward the left, carrying the valve body 10 with it by virtue of the interconnecting bracket 92. Assuming the stem sections 60 and 62 are held against longitudinal movement, by connection of the threaded end of the stem section 60 to the tracer device, leftward movement of the valve body effects unseating of the annular seal 36 from its associated seat 34, and seating of the annular seal 48 against its associated seat 46. Hydraulic pressure from the pump thus is directed not only to the left end of the drive cylinder but also to the right end of the cylinder through the motor port 24 and conduit 108. Since the seal 48 is closed against its associated seat 46, hydraulic pressure is prevented from flowing to the exhaust passageway 22.

Accordingly, hydraulic pressure in the right end of the drive cylinder increases until its reaction against the right-hand face of the piston 94 balances the reaction of the hydraulic pressure against the piston rod end of the piston. At this point relative movement between the piston and cylinder is stopped, with the annular seal 36 returned into sealing engagement with its associated seat 34.

As previously explained, the desired adjustment of the valve members provides a slight clearance between the seal 48 and seal 46 when the other seal 36 is sealed against its associated seat 34. Hydraulic pressure from the pump thus is permitted to bleed through the clearance between the seal 48 and seat 46 for return through the exhaust passageway 22 to the pump reservoir. This tends to unseat the seal 48 from its associated seat 46 slightly to maintain a dynamic balance on the drive cylinder unit. Accordingly, subsequent movement of the drive cylinder unit is initiated by a much smaller movement of the stem sections than is required under a static balance condition of the drive cylinder unit.

Let it now be assumed that a tracer force is applied to the threaded end of the stem section 60 to move the stem sections toward the right. The seal 48 thus is closed against its seat 46 and the seal 36 is separated from its seat 34 to allow fluid pressure from the pump to be applied to both ends of the drive cylinder. Because of the larger surface area of the right end of the piston, as compared with the area of the left, rod end of the piston, the hydraulic pressure in the right end of the cylinder causes the latter to move toward the right, carrying the valve body with it. Thus, the valve body moves toward the right until the seal 36 closes against its seat 34, to stop further movement of the drive cylinder and the load connected to it. During this movement of the cylinder and valve body to the right, hydraulic fluid in the left side of the cylinder is returned through motor port 20 and combined with hydraulic fluid being delivered to the right end of the cylinder.

Conversely, if the tracer force applied to the stem sections causes the latter to move toward the left, the valve seal 48 separates from its associated seat 46. The right end of the drive cylinder thus is connected to the exhaust passageway whereupon fluid pressure in the right end of the cylinder is relieved. Fluid pressure applied from the pump to the left end of the cylinder thus causes the latter to move toward the left, carrying the valve body with it until the valve seat 48 closes against its seat 46.

As the valve seals and seats wear with continued use, readjustment of the spacing between the seals may be effected externally of the valve, simply by removing the plug 74, loosening the setscrew 72 and rotating the stem section 62 relative to the other stem section 60, until proper spacing has been achieved.

By virtue of the foregoing provision for external adjustment of the spacing of the valve seals, operational hysteresis is substantially eliminated. For example, it has been found that this feature of the adjustability enables the valve to function to reproduce any predetermined set point of a load, from either direction of approach, with an accuracy of plus or minus two ten-thousandths of an inch.

Although the tracing valve described hereinbefore has particular utility in hydraulic pressure systems, it may also be utilized advantageously for a variety of purposes in pneumatic or other fluid pressure systems.

It will be apparent to those skilled in the art that various changes may be made in the size, shape, number and arrangement of parts described hereinbefore. For example, the cylinder 90 may be fixed to the support 98 and the piston rod 86 connected through bar 100 to a load to be moved. In such event the valve body 10 is attached to the movable piston rod 96 through bracket 92. Various other changes may be made without departing from the spirit of this invention.

Having now described my invention and the manner in which it may be used, I claim:

1. A fluid pressure tracing valve comprising
   a. a hollow body,
   b. a pair of hollow valve members reciprocative in said body relative to associated seats for selectively interconnecting fluid pressure inlet, exhaust and motor passageways in the body, c. resilient means interengaging the valve members and urging them apart, d. abutment means on each valve member, e. a pair of stem members extending through the hollow valve members and arranged for movement by a tracer force, f. stop means on each stem member engaging the associated abutment means for limiting the separation of the valve members by the resilient means and for moving each valve member by selective movement of the pair of stem members, and g. means interengaging the stem members for adjusting the spacing between said stop means and hence the valve members.

2. The tracing valve of claim 1 including annular fluid pressure passageway means in the outer peripheries of the valve members for balancing the latter radially.

3. The tracing valve of claim 2 wherein the means interengaging the stem members comprises interengaging threaded sections of the stem members, and the stop means on the stem members comprise shoulders extending outward adjacent said threaded sections.

4. The tracing valve of claim 2 including a. end members closing the opposite ends of the hollow body and receiving the projecting ends of the stem members slidably therethrough, and b. bypass passageway means communicating the inner ends of the valve members with the outer ends of the latter for equalizing fluid pressure at the opposite ends of the valve members.

5. The tracing valve of claim 2 including a. fluid pressure infeed passageway means in the body adapted for communication with a source of fluid under pressure, b. fluid pressure infeed passageway means in one of the valve members communicating with the infeed passageway means in the body, c. fluid pressure exhaust passageway means in the body, d. fluid pressure exhaust passageway means in the other valve member communicating with the exhaust passageway in the body, and e. fluid pressure motor passageway means in the body arranged for communication with the infeed and exhaust passageway means selectively upon relative movement of the body and valve members.